_2,890,244_

2,4,6-TRIBROMO-3-ACETYLAMINOBENZOIC ACID AND SALTS THEREOF

Werner Storbeck, Frankfurt am Main, Germany, assignor to "Endopharm" Frankfurter Arzneimittelfabrik G.m.b.H., Frankfurt am Main, Germany, a corporation of Germany No Drawing. Application September 7, 1956
Serial No. 608,432

3 Claims. (Cl. 260—518)

The present invention relates to new X-ray contrasting agents and, more particularly, to 2,4,6-tribromo-3-acetylaminobenzoic acid and its non-toxic, water-soluble salts. The acid of this invention can be represented by the structural formula

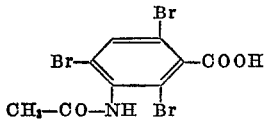

It is the object of this invention to provide highly water soluble X-ray contrasting agents which can be economically produced. It is a further object to provide agents suitable for use in patients in whom the use of iodine containing drugs is contraindicated. The salts of the acid described hereinabove are particularly suitable for bronchial X-rays, for which purpose, e.g. the sodium salt can be used in a solution of appropriate viscosity. The N-methylglucosamine salt is particularly suitable for visualization of cavities in the head, for which large amounts of contrasting agents frequently have to be administered very rapidly.

On administration of 2,4,6-tribromo-3-acetylaminobenzoic acid to animals, no noticeable liberation of bromine occurs. On oral administration of relatively large amounts of the sodium salt, no toxic reactions have been observed. The acid of this invention is conveniently prepared by use of 2,4,6-tribromo-3-aminobenzoic acid as a starting material. In one of the preferred methods, vigorous conditions of acetylation are employed so that the diacetylamino derivative is first formed. The 2,4,6-tribromo-3-diacetylaminobenzoic acid is then subjected to cautious alkaline hydrolysis so as to form a salt of the 3-monoacetylamino compound. The monoacetyl derivative is thus obtained in excellent yield.

2,4,6-tribromo-3-acetylaminobenzoic acid forms non-toxic and pharmaceutically acceptable salts with a variety of inorganic and organic bases. Among the suitable salts are such alkali metal salts as the sodium salt, alkaline earth salts such as the calcium salt, salts of lower alkyl, dialkyl, or trialkylamines or corresponding alkanolamines, N-methylglucosamine and the like.

The invention will be described in further detail by the following examples. However these examples are merely illustrative and are not to be construed as limiting the invention in spirit or in scope. In these examples, quantities are indicated in milliliters (ml.) and grams (g.).

*Example 1*

140.3 g. of 2,4,6-tribromo-3-aminobenzoic acid are refluxed for two hours in 330 g. of acetic anhydride. After dilution with 1,000 ml. of water and boiling with charcoal, the mixture is filtered and hydrochloric acid is added to the filtrate to cause the precipitation of 2,4,6-tribromo-3-diacetylaminobenzoic acid. The precipitate is collected on a filter. The dried crystals melt at about 198° C. However, for the purpose of this experiment it is not necessary to dry the crystals and it is possible to use the moist filter cake which still retains a small amount of acetic anhydride.

176.2 g. of the somewhat moist crude product are treated in the course of 30 minutes at 60–70° C. with small portions of a total of 300 ml. of 10% aqueous sodium hydroxide. While the temperature is maintained at 70° C., there are added very small portions of a total of 20 ml. of 10% of aqueous sodium hydroxide in the course of an hour. Addition of sodium hydroxide is stopped when the solution no longer becomes acid in the course of five minutes. At that time a sample cooled to 20° C. should produce no crystal formation. The total hydrolysis time thus takes about 90 minutes at a hydrolysis temperature of 60–70° C.

The solution of the sodium salt thus obtained is stirred with charcoal, filtered, and then slowly treated with a mixture of 70 ml. of 37% hydrochloric acid and 650 ml. of water with cooling. The 2,4,6-tribromo-3-acetylaminobenzoic acid thus obtained melts at about 258° C.

*Example 2*

2,4,6-tribromo-3-acetylaminobenzoic acid is transformed into its salts either by neutralization with exactly one equivalent of base, or after suitable double decomposition, by concentration of the aqueous solution. Thus, well crystallized salts are obtained. In the case of the sodium salt, more than 10 g. of salt are completely soluble in 10 ml. of water. This aqueous solution of the sodium salt has no tendency to crystallization even after storage for several years and has a pH of 6.9 to 7. For retrograde pyelography 50 g. of sodium salt are dissolved in water to make a total volume of 100 ml.

What is claimed is:

1. A member of the class consisting of the compound structural formula

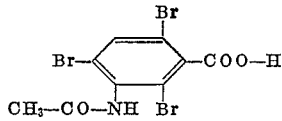

and its non-toxic salts.

2. 2,4,6-tribromo-3-acetylaminobenzoic acid.

3. The sodium salt of 2,4,6-tribromo-3-acetylaminobenzoic acid.

References Cited in the file of this patent
UNITED STATES PATENTS

| | | |
|---|---|---|
| 2,135,474 | Parsons | Nov. 1, 1938 |
| 2,611,786 | Wallingford | Sept. 23, 1952 |